J. W. ROONEY.
PROTECTOR FOR MOTOR CAR TIRES.
APPLICATION FILED JULY 22, 1916.
1,231,430. Patented June 26, 1917.
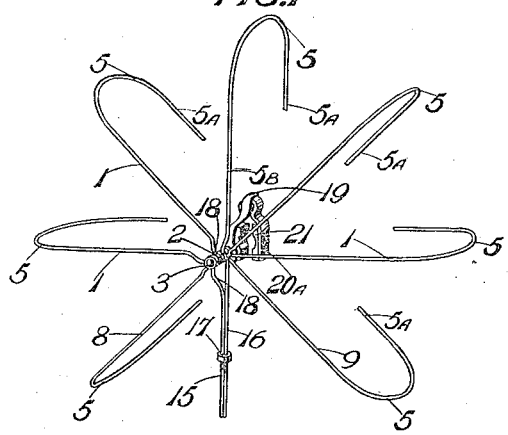
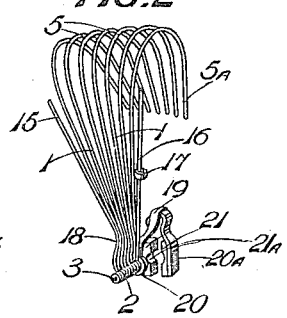
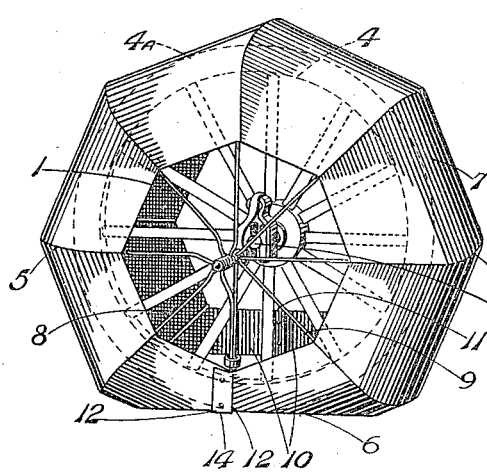
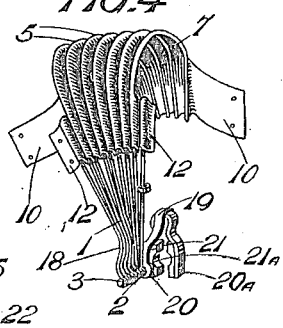
Witnesses
Inventor
John W. Rooney,
by
Attorney.

UNITED STATES PATENT OFFICE.

JOHN WILLIAM ROONEY, OF HERIOT, NEW ZEALAND.

PROTECTOR FOR MOTOR-CAR TIRES.

1,231,430.

Specification of Letters Patent.

Patented June 26, 1917.

Application filed July 22, 1916. Serial No. 110,771.

*To all whom it may concern:*

Be it known that I, JOHN WILLIAM ROONEY, a subject of King George V of Great Britain, residing at Heriot, in the Dominion of New Zealand, have invented certain new and useful Improvements in Protectors for Motor-Car Tires, of which the following is a specification.

This invention relates to means designed for protecting motor tire casings or shoes from the weather.

The object of my invention is to provide a light and quick fitting article to cover motor tires to protect them from the heat of the sun and other deteriorating elements when the car is standing, the article being preferably attached to the cap piece of the axle of each wheel.

At present the detrimental effect upon tires of a car which has been standing for some time in the sun is noticeable to the owner, and is often the cause of blow outs and punctures, and while the ordinary mud guards of the car cover the tires for a certain distance they cannot be brought low enough to surround the cover as is required.

In the drawings accompanying this specification:—

Figure 1 is a perspective view of the invention, the cloth covering member being removed for clearness to indicate the construction of the frame members.

Fig. 2 is a perspective view of the frame members partly closed, showing the method of mounting same.

Fig. 3 is a perspective view of the invention placed in position upon a wheel of a car.

Fig. 4 is a perspective view of the invention partly folded.

This invention is constructed as will now be described it being understood that minor alterations may be made in the constructional features of the apparatus without departing from the essential features of the invention.

The apparatus comprises a frame constructed preferably from light metal ribs (1). An end of each rib (1) forming the frame, is provided with a loop portion (2) adapted to embrace a shaft member (3) upon which the ribs turn for the purpose of allowing the frame to surround the tire. The other end of the wire is produced from the shaft member (3) for a distance approximately equal to the radius of the car wheel (4). The ribs (1) are then bent to conform with the contour of the tire (4^A), their shape being indicated at (5), the ends (5^A) projecting downward to any desired distance on the opposing side of the tire. One of the ribs (5^B) forming the frame does not require the loop portion (2), as the rib is secured to the shaft member (3) in a vertical position as indicated at (5^B) in Fig. 1. This construction enables the remaining ribs to drop in equal numbers from both sides of the vertical rib (5^B) permitting the cut away part (6) of the cover being always adjacent to the ground. The ribs forming the frame may be covered with any material (7) which is impervious to the rays of the sun; it has been found that duck suits the purpose. The part (6) of the apparatus which covers the tire is cut as shown in the drawings so that the cover between ribs (8) and (9) comes close to the ground and covers the part of the tire which rests on the ground, preventing the necessity of raising the wheel when the cover is being fitted. The cover is provided with end pieces (10), the said end pieces being extended, so as to couple with each other when the cover is in position, as indicated at (11) Fig. 3.

Two of the rib members (15) and (16) are formed without the bent portion (5) to allow the cover to clear the ground when in position. The ends (12) of the covering material extend and are adapted to fasten with each other as indicated at (14) Fig. 3. To keep the cover in position around the wheel a retaining member (17) is attached to one of the straight wires (15) and is adapted to engage with the opposing straight wire (16). As before mentioned all the wires are preferably brought to a common center and mounted on the pivot shaft (3). At a point in close proximity to the shaft the ribs (1) are bent as at (18) Fig. 1, so that they may close up in alinement as indicated in Fig. 2. Attached to the shaft (3) at the end facing the axle of the car is a metal bracket piece (19) constructed preferably as illustrated, the bracket piece engaging with a spring clip comprising two jaws (20) and (20^A) having their inner surfaces faced with wood or rubber blocks (21). An indentation or seat (21^A) is formed in each block to enable the cap (22) of the axle of the car wheel to fit therein when the cover is placed in position. It is obvious that while one form of the clipping attachment has been shown there are many well known forms which can be adapted to this invention, and while I have described the cover as being adapted to fit on the cap piece of the axle of each wheel it may be attached to the ribs or spokes of the wheel if so desired.

*In operation.*—To cover the tires, the spring clip member is slipped over the cap piece of the axle of each wheel and the frame is opened out until it surrounds the tire, then the ends of the material covering the frame are brought together and fastened by the means already described.

Having thus described my invention, I claim as new and desire to secure by Letters Patent:—

1. A protector for motor car tires, comprising a frame adapted to encircle the tire and consisting of a set of connected ribs or members; a covering for said frame; and a device for attaching said frame to the wheel of the car.

2. A protector for motor car tires, comprising a collapsible frame adapted, when expanded, to encircle the tire, said frame consisting of a set of pivotally-mounted ribs or members; a flexible covering for said frame; and a device for attaching said frame to the wheel of the car.

3. A protector for motor car tires, comprising a frame adapted to encircle the tire and consisting of a set of connected ribs or members; a covering for said frame; and a spring clip connected with said frame and engageable with the wheel of the car to attach the frame thereto.

4. A protector for motor car tires, comprising a collapsible frame adapted, when expanded, to encircle the tire, said frame consisting of a set of pivotally-mounted ribs or members; a flexible covering for said frame; and a spring clip connected with said frame and engageable with the wheel of the car to attach the frame thereto.

5. A protector for motor car tires, comprising a collapsible frame adapted, when expanded, to encircle the tire, said frame consisting of a set of ribs or members; and a shaft from which said ribs radiate and to which they are pivoted at their inner ends; a flexible covering for said frame; and a device for attaching said frame to the wheel of the car.

6. A protector for motor car tires, comprising a collapsible frame adapted, when expanded, to encircle the tire, said frame consisting of a set of ribs or members, and a shaft from which said ribs radiate and to which they are pivoted at their inner ends; a flexible covering for said frame; a bracket secured to said shaft; and a spring clip carried by said bracket for engagement with the car wheel to attach said frame thereto.

7. A protector for motor car tires, comprising a collapsible frame adapted, when expanded, to encircle the tire, said frame consisting of rigid and movable ribs or members, and a shaft from which said ribs radiate and to which they are connected at their inner ends; and means connected to said shaft for engagement with the car wheel to attach said frame thereto.

8. A protector for motor car tires, comprising a collapsible frame composed of a set of ribs or members, certain of which have their outer ends bent to extend over and across the tire, and a shaft from which said ribs radiate and to which they are connected at their inner ends; a flexible cover connecting the outer portions of said ribs; and a device connected to said shaft for engagement with the car wheel to attach said frame thereto.

9. A protector for motor car tires, comprising a collapsible frame composed of a plurality of ribs or members having U-shaped outer ends adapted to straddle the tire, a pair of straight ribs or members interposed between two of the first-named ribs, and a shaft from which all of said ribs radiate and to which they are pivotally connected at their inner ends; a flexible cover connecting the U-shaped portions of said first-named ribs and adapted to encircle the tire when said frame is expanded; a retaining device for connecting said straight ribs together, to maintain said frame in expanded condition; means for connecting the ends of said cover together; and a device connected to said shaft for engagement with the car wheel to attach said frame thereto.

10. A protector for motor car tires, comprising a collapsible frame, composed of a plurality of ribs or members having U-shaped outer ends adapted to straddle the tire, and a shaft from which said ribs radiate and to which they are connected at their inner ends; a flexible cover connecting the U-shaped portions of said ribs and adapted to encircle the tire when said frame is expanded; means for connecting the ends of said cover together; and a device connected to said shaft for engagement with the car wheel to attach said frame thereto.

In testimony whereof I have hereunto set my hand in presence of two subscribing witnesses.

JOHN WILLIAM ROONEY.

Witnesses:
  ROBERT PARK, Jnr.,
  EILEEN CARTER.